United States Patent
Boer et al.

[15] 3,707,141
[45] Dec. 26, 1972

[54] CAPSTAN CABLE DRIVE

[72] Inventors: Elmer J. Boer; Robert L. Van Huis, both of Zeeland, Mich.

[73] Assignee: U.S. Industries, Inc., New York, N.Y.

[22] Filed: July 10, 1970

[21] Appl. No.: 53,837

[52] U.S. Cl. .................................................. 119/22
[51] Int. Cl. .............................................. A01k 31/04
[58] Field of Search ....... 119/22, 28; 254/150, 175.5, 254/175.7, 186; 74/230.01, 230.05, 230.5, 229

[56] References Cited

UNITED STATES PATENTS

| | | | |
|---|---|---|---|
| 3,458,029 | 7/1969 | Allen et al. | 119/22 X |
| 3,210,050 | 10/1965 | Harmony | 254/186 X |
| 927,200 | 7/1909 | Wick | 254/186 X |
| 3,318,576 | 5/1967 | Kitson | 254/175.5 |

Primary Examiner—Hugh R. Chamblee
Attorney—Price, Heneveld, Huizenga & Cooper

[57] ABSTRACT

A pit cleaner for cages such as poultry cages and featuring a cable-pulled scraper and a cable drum on which the cable is wrapped and unwrapped to drive the cable, the drum being characterized as a capstan, the cable-engaging surface of which slopes away at the low point thereof from the axis of the capstan at an angle of between 5° and 25°.

5 Claims, 4 Drawing Figures

PATENTED DEC 26 1972　　　　　　　　　　　　　　3,707,141

INVENTORS
ELMER J. BOER
ROBERT L. VAN HUIS

BY Price Heneveld
Huizenga & Cooper

ATTORNEYS

CAPSTAN CABLE DRIVE

BACKGROUND OF THE INVENTION

In pit cleaners such as are utilized for automatically cleaning manure pits for poultry cages, it has been customary to wind and unwind the cable which pulls the scraper blade in the pit on a fairly complicated series of pulleys, or on a flat drum. The disadvantage of the pulley system is the complexity of the system, particularly when tension must be increased on the cable. Although a drum around which the cable winds avoids these difficulties present in a pulley system, heretofore drums have suffered the disadvantage of run-out at the ends due to the flat surface of the drum, or if flanges are used on the drum, bunching of the cable at the flanges. Such bunching is undesirable due to the tendency of the cable to lock upon itself when so bunched.

SUMMARY OF THE INVENTION

The disclosure concerns a pit cleaner utilizing a cable pulling a scraper blade, wherein the drum around which the cable is wound is especially designed to prevent both run-out of the cable therefrom and bunching. Specifically, the drive mechanism for winding and unwinding the cable utilizes a cable drum which is a capstan, the exterior surface of which has a diameter which increases from a minimum value approximately at the longitudinal center of the drum to maximum values at the rims thereof, the increase providing an angle of slope which has a value of between 5° and 25°, whereby the cable winds onto the capstan on alternate ones of the high sides of the surface and unwinds approximately at the longitudinal center of the capstan.

Accordingly, it is an object of the invention to provide a cable drum for winding and unwinding a cable which directs the movement of a scraper blade in a manure pit, the drum being designed to prevent run-out of the cable thereupon as well as bunching of the cable.

It is a related object of the invention to provide such a cable drum wherein the exterior surface is designed to automatically increase the tension on the tension side of the cable, thereby preventing run-out of the cable on the drum.

It is yet another object of the invention to provide such a cable drum which will accommodate a pair of pit cleaners on the same drum simultaneously.

Other objects and advantages will become apparent upon reference to the following drawings and detailed discussion.

DESCRIPTION OF THE PREFERRED EMBODIMENT

Figure 1:
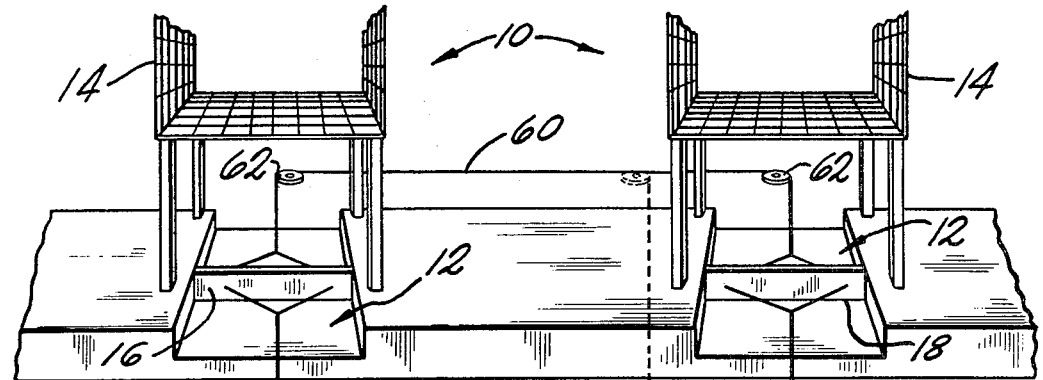
FIG. 1 is a partly schematic fragmentary front elevational view of a pit cleaner constructed in accordance with the invention, utilized in a poultry house.

The pit cleaner provided by the invention can be utilized for removing manure produced by caged animals of any sort. Specifically, the pit cleaner is shown in conjunction with poultry cages 10 of which only fragments are shown, for removing poultry manure which drops into pits 12. The poultry are conventionally confined above the pits 12 by cage structures 14. Each pit cleaner features a scraper blade 16 or 18 which is connected to a cable 20. The cable 20 in turn is wound upon a cable driving drum 30, adjusting pulleys 22 being utilized to alter the tension on the cable 20. As the drum is rotated, the cable is pulled so as to pull the scraper blade 16 or 18. The drum 30 is conventionally mounted upon a drive shaft 24 which may be conventionally driven by a reversible motor 26 through a drive train 28. (See FIG. 2.)

Figure 3:
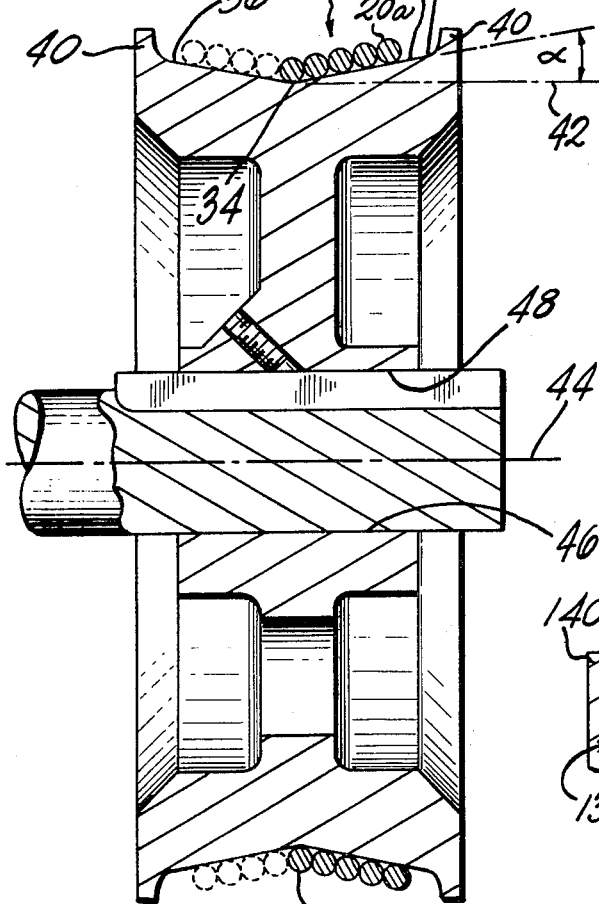
FIG. 3 is a sectional view of the cable drum, taken generally along the line III—III of FIG. 2.

In accordance with one aspect of the invention, the drum 30 is a capstan having an exterior cable-engaging surface 32 which is especially adapted to increase the tension in the cable 20 as the cable moves from a longitudinal center portion 34 of the surface 32 in either direction therefrom. As used throughout this application, "capstan" means a drum-like cylinder mounted for rotation about an axis oriented in any direction and having a surface the longitudinal center portion of which is smaller in diameter than any other portion of the surface. Thus, the minimum diameter of the surface 32 is at the approximate longitudinal center 34. The remaining portions of the surface 32 are high sides 36 and 38 which are characterized by ever increasing diameters until the maximum diameters of the surface 32 are reached at the rims 40. As shown in FIG. 3, the ever increasing diameters which define the high sides 36 and 38 increase at a linear rate, the rates being equal for both sides. However, it should be noted that the equality in rates is not necessary. This linear rate of increase results in each of the high sides 36 and 38 being a flat surface sloped at an angle "alpha" from a plane designated by the line 42 which extends parallel to the axis 44 of the drum. The value of the angle "alpha" can vary between 5° and 25°. The steeper the slope, the fewer windings of cable 20 which are necessary to cause the drum 30 to frictionally engage the cable. However, if the angle "alpha" exceeds 25°, the cable tends to bunch rather than wind and unwind uniformly. As shown in FIG. 3, the rims 40 have approximately equal diameters.

The capstan 30 can be made of any conventional metal in any conventional fashion, having any desired width. For a ¼ inch steel cable, the capstan shown in FIG. 3 has a width of 4 inches. The center of the capstan 30 is provided with a cylindrical bore 46 and a keyway 48 for fitting the capstan upon the drive shaft 24.

The cable 20 then is wound around the capstan 30 a number of wraps sufficient to insure that the cable will not slip on the capstan. The actual number of wraps will vary depending on the coefficient of friction provided by the surface coating of the cable 20.

OPERATION

Figure 2:
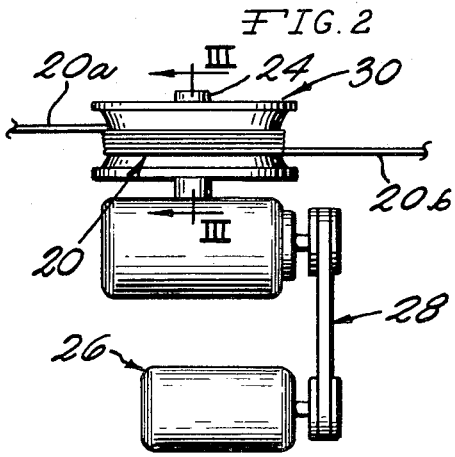
FIG. 2 is a plan view of the drive mechanism, illustrating the cable winding and unwinding upon the drum of the invention.

Considering the capstan 30 in use with the scraper blade 16, the reversible motor 26 causes the capstan 30 to rotate in the direction of the arrows as shown in FIG. 1. If the capstan rotates clockwise, the cable 20 will take the position on the capstan 30 as shown in FIGS. 2 and 3. In that case, the tension will be placed upon portion 20a of the cable 20, which will ride up upon the high side 38 of the capstan exterior surface 32. Eventually, the portion 20a reaches that part of the high side 38 which by its increased diameter causes the tension on the portion 20a to reach the point at which no further climbing occurs. Meanwhile, portion 20b of the cable 20 is provided with slack, the portion 20b thus seeking the lowest point in the surface 32. For this reason, the portion 20b ends up at the approximate longitudinal center 34 of the surface, which location further increases the slack in the portion 20b of the cable. When the motor 26 is reversed so as to rotate the capstan 30 in the counterclockwise direction shown in FIG. 1, portion 20b becomes the portion under tension so as to cause that portion to move up the high side 36 in the fashion shown in phantom in FIG. 3. This causes the scraper blade 16 to move toward the capstan as opposed to its movement away as in the previous case when portion 20b was not under tension.

As shown in FIG. 1, the closed circuit for the pit cleaner is accomplished by connecting one end of the cable 20 to the scraper blade 16 and the opposite end of the cable to the scraper blade 18. The opposite sides of the scraper blades 16 and 18 are then connected to a second cable 60 in an identical fashion, the cable 60 having, however, no capstan but simply tension adjusting pulleys 62 about which the cable is partially wrapped. By such a construction, two pits can be cleaned by the single operation of the drum 30 with only the addition of a second cable 60. It will be immediately obvious that as the scraper blade 16 is being drawn toward the capstan 30, the blade 18 is being drawn away; and vice versa if the capstan 30 is reversed in direction of rotation.

ALTERNATE EMBODIMENTS

Figure 4:
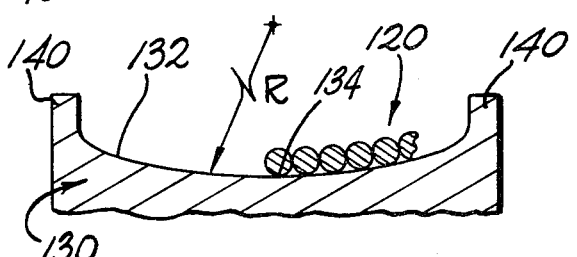
FIG. 4 is a fragmentary sectional view similar to FIG. 3 but illustrating an alternate embodiment.

The exterior surface of the capstan can be provided with a curved surface. FIG. 4 illustrates this particular embodiment, parts similar to those previously described being indicated with the same reference numerals to which the distinguishing prefix 100 has been added. Thus, capstan 130 is provided with an exterior surface 132 which is curved from rim 140 to rim 140. The point of minimum diameter is the approximate longitudinal center 134. The radius of curvature R as schematically indicated in FIG. 4 must have a value which defines with respect to the width of the drum a ratio of between 2.5/4 and 10.5/4. For example, a value of R equal to 10.5 inches for a capstan 30 having a width of 4 inches will produce a minimum curved slope usable with the invention. A ratio which is less than the 2.5 to 4 ratio will not allow the cable 120 to move up and down the surface 132 in a uniform fashion, because the slope of surface 132 will be too steep. It will also be appreciated that the surface 132 could have a constantly varying radius of curvature.

Another possible modification utilizing the capstan cable drum of the invention is shown in phantom in FIG. 1. In this case, the cable 20 is connected to only the scraper blade 16 at its two ends, thus requiring the tension adjusting pulleys 22 and 62 to be located as shown in phantom.

Although the invention has been described in connection with certain preferred embodiments, it is not intended that the invention be limited thereto. Rather, it is intended that the invention cover all alternative arrangements, equivalents, and alternate embodiments as may be included within the scope of the following claims.

The embodiments of the invention in which an exclusive property or privilege is claimed are defined as follows.

1. A pit cleaner for poultry cages comprising, in combination: at least one manure pit, a scraper blade slidably contained within said pit and connected in a closed circuit to at least one cable wherein pulling tension in one direction on said blade is permitted by slack on the cable in the other direction, and means for reversibly driving said cable including a motor and a cable drum around which said cable is wound under tension; said drum being characterized in that it is a capstan the exterior surface of which has a diameter which increases from a minimum value approximately at the longitudinal center of the drum to maximum values at the rims thereof, the increase providing an angle of slope from a plane parallel to the axis of said drum which angle has a value between 5° and 25°, whereby said cable when under increased tension winds onto said capstan on alternate ones of the high sides of said surface depending upon the direction of rotation of said capstan by said motor, and unwinds when under decreased tension approximately at said longitudinal center.

2. The pit cleaner as defined in claim 1, wherein said surface slopes at a linear rate from said longitudinal center.

3. The pit cleaner as defined in claim 1, wherein said surface is curved; the radius of curvature of said surface and the width of said drum defining a ratio of between 2.5/4 and 10.5/4.

4. The pit cleaner as defined in claim 1, wherein the maximum diameters at said rims are approximately equal.

5. The pit cleaner as defined in claim 1, and further including a second pit containing a second scraper blade, said one cable being connected at its opposite ends to said one and said second blades, and a second cable connected at its ends to said blades in a manner which opposes the force exerted by said one cable, whereby said one and said second blades act to complete the closed circuit so that operation of said capstan to pull one of the blades toward said capstan causes the other of said blades to move away therefrom.

* * * * *